(12) United States Patent
Kobayashi

(10) Patent No.: US 9,770,948 B2
(45) Date of Patent: Sep. 26, 2017

(54) DISPLAY DEVICE

(71) Applicant: YAZAKI CORPORATION, Minato-ku, Tokyo (JP)

(72) Inventor: Ryo Kobayashi, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 83 days.

(21) Appl. No.: 14/962,545

(22) Filed: Dec. 8, 2015

(65) Prior Publication Data

US 2016/0090035 A1 Mar. 31, 2016

Related U.S. Application Data

(63) Continuation of application No. PCT/JP2014/066014, filed on Jun. 17, 2014.

(30) Foreign Application Priority Data

Jun. 21, 2013 (JP) ................................. 2013-130777

(51) Int. Cl.
*B60Q 9/00* (2006.01)
*B60C 9/00* (2006.01)
(Continued)

(52) U.S. Cl.
CPC ............... *B60C 9/00* (2013.01); *B60K 35/00* (2013.01); *B60K 37/02* (2013.01); *B60R 2300/80* (2013.01)

(58) Field of Classification Search
CPC .......... B60Q 9/00; B60K 35/00; B60K 37/02; B60K 2350/1064; B60K 2350/1072; B60R 2300/80; G01D 11/28
See application file for complete search history.

(56) References Cited

U.S. PATENT DOCUMENTS 4,430,648 A * 2/1984 Togashi ................ G06F 3/0412
                                                            345/205
5,659,822 A * 8/1997 Sasagaki ................ G03B 17/18
                                                            345/467
(Continued)

FOREIGN PATENT DOCUMENTS

DE          199 41 957 A1    3/2001
DE     10 2005 003 920 A1    9/2005
(Continued)

OTHER PUBLICATIONS

International Search Report for PCT/JP2014/066014 dated Aug. 5, 2014 [PCT/ISA/210].

(Continued)

*Primary Examiner* — Orlando Bousono
(74) *Attorney, Agent, or Firm* — Sughrue Mion, PLLC

(57) ABSTRACT

A display section displays a shift indicator in a smaller size than that in a normal state at the start of display (upon switching the display) of the shift indicator. After that, the display section gradually enlarges a size of the shift indicator until it has a larger size than that in the normal state, and then gradually reduces the size of the shift indicator until it has the size in the normal state, thereby starting the display of the shift indicator in the size in the normal state. This operation provides a display device through which a driver can readily recognize the current shift position.

7 Claims, 5 Drawing Sheets

(51) Int. Cl.
*B60K 35/00* (2006.01)
*B60K 37/02* (2006.01)

(56) References Cited

U.S. PATENT DOCUMENTS

| | | | | |
|---|---|---|---|---|
| 7,196,700 | B1* | 3/2007 | Aho | G09G 3/20 345/211 |
| 2004/0201465 | A1* | 10/2004 | Meyer | F16H 63/42 340/438 |
| 2005/0168330 | A1 | 8/2005 | Ono et al. | |
| 2006/0071892 | A1* | 4/2006 | Sakaguchi | G09G 3/3648 345/89 |
| 2006/0092098 | A1* | 5/2006 | Yokota | B60K 35/00 345/33 |
| 2007/0109284 | A1* | 5/2007 | Yamazaki | G09G 3/20 345/204 |
| 2007/0171142 | A1* | 7/2007 | Ikarashi | B60K 35/00 345/4 |
| 2007/0176918 | A1* | 8/2007 | Aho | G09G 3/20 345/211 |
| 2008/0150845 | A1* | 6/2008 | Ishii | G09G 3/3208 345/77 |
| 2008/0258892 | A1* | 10/2008 | Itoh | B60K 37/02 340/441 |
| 2008/0291224 | A1* | 11/2008 | Ishii | G09G 3/3233 345/690 |
| 2010/0191404 | A1* | 7/2010 | Ishikawa | B60K 35/00 701/31.4 |
| 2010/0283597 | A1* | 11/2010 | Yoda | B60K 35/00 340/461 |
| 2011/0164053 | A1* | 7/2011 | Nakamura | G01C 21/3664 345/629 |
| 2012/0056736 | A1* | 3/2012 | Katoh | B60K 35/00 340/439 |
| 2013/0135093 | A1* | 5/2013 | Araki | B60K 35/00 340/459 |

FOREIGN PATENT DOCUMENTS

| | | |
|---|---|---|
| DE | 10 2007 018 071 A1 | 10/2008 |
| JP | 62-058112 A | 3/1987 |
| JP | 07-027962 U | 5/1995 |
| JP | 2000-221915 A | 8/2000 |
| JP | 2002-046505 A | 2/2002 |
| JP | 2003-076311 A | 3/2003 |
| JP | 2003-345334 A | 12/2003 |
| JP | 2004-136823 A | 5/2004 |
| JP | 2007-121822 A | 5/2007 |
| JP | 2010-160024 A | 7/2010 |
| JP | 2012-194016 A | 10/2012 |

OTHER PUBLICATIONS

Communication dated Jul. 26, 2016, from the Japanese Patent Office in counterpart Japanese application No. 2015-522929.
Communication dated Mar. 2, 2017 from the German Patent Office in counterpart Application No. 11 2014 002 915.7.

* cited by examiner

DISPLAY PATTERN 1

DISPLAY PATTERN 2

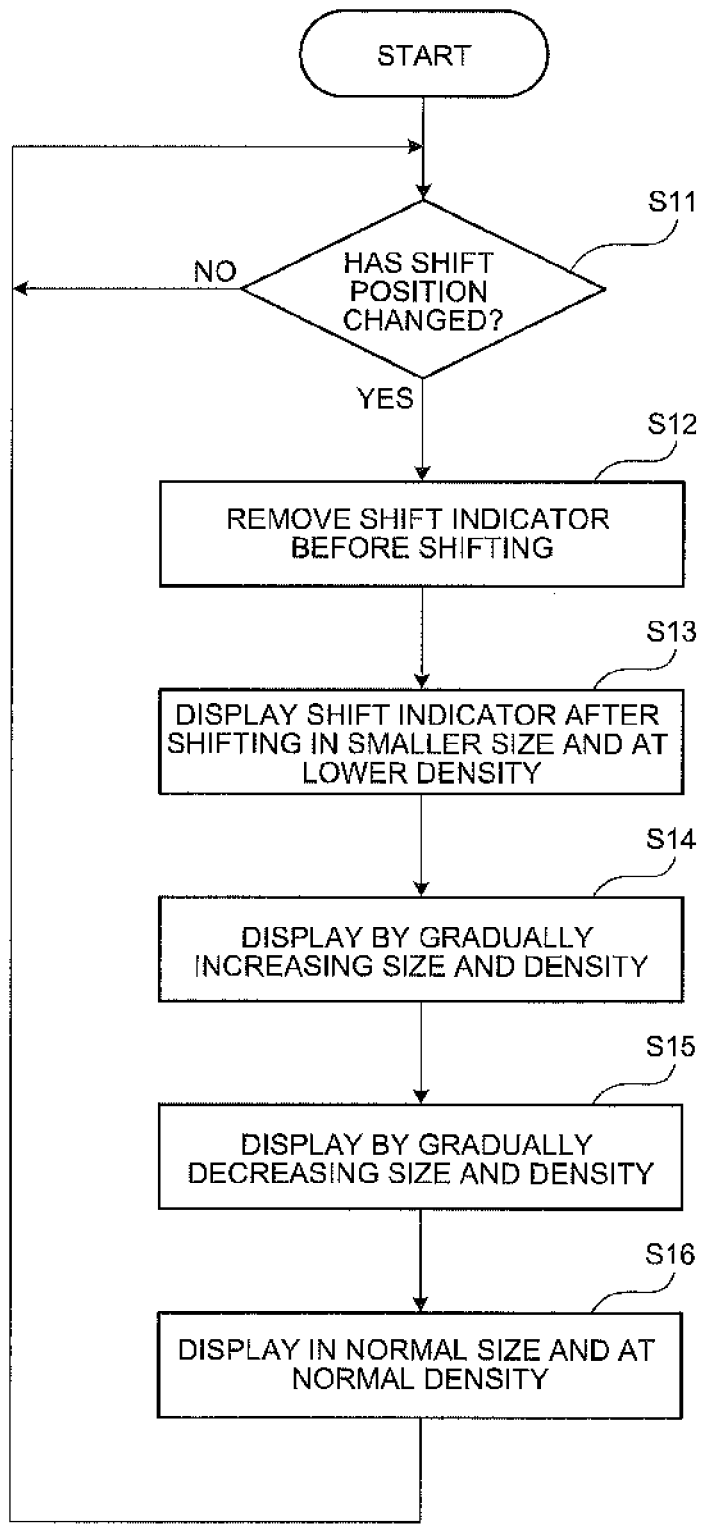

DISPLAY DEVICE

CROSS-REFERENCE TO RELATED APPLICATION

This application is a continuation application of International Application PCT/JP2014/066014, filed on Jun. 17, 2014, and designating the U.S., the entire contents of which are incorporated herein by reference.

BACKGROUND OF THE INVENTION

1. Field of the Invention

The present invention relates to a display device that displays a display element representing a shift position.

2. Description of the Related Art

In recent years, graphical meters have been known that use a display device such as a liquid crystal display for displaying vehicle meters on a screen (refer to Japanese Patent Application Laid-open No. 2000-221915, for example).

Graphical meters have high flexibility in display on screens, which can achieve various types of novel mode of display. Some of such graphical meters display, for example, a display element representing the current shift position on a screen. A shift position is an operation position of a shift lever disposed near a driver's seat. The shift position corresponds to the shifting state (the reduction ratio) of a transmission mounted on a vehicle. For example, an automatic transmission has shift positions such as the parking "P", the reverse (back) "R", the neutral "N", and the drive "D". The driver needs to aware of the current shift position to drive the vehicle.

Typically, conventional graphical meters present the current shift position by switching display elements. For example, the character "P" is displayed when the shift position is in the parking and the character "D" is displayed when the shift position is in the driving, thereby presenting the current shift position to a driver.

Unfortunately, conventional display devices often display the above-described display elements in a smaller size than that of other display elements. In addition, the above-described display elements are not easily paid attention to during driving. For this reason, the driver has difficulty in finding a change in the display contents of the above-described display elements.

SUMMARY OF THE INVENTION

In view of the circumstances described above, the present invention aims to provide a display device through which a driver can readily recognize a display element such as the current shift position.

To achieve the above-described objective, a display device according to one aspect of the present invention includes a display section that is mounted on a vehicle, configured to display a display element presenting information to a driver in a given size, and capable of switching the display element, wherein the display section displays the display element in a smaller size than the given size at a start of display of the display element, gradually enlarges a size of the display element until it has a larger size than the given size, and then gradually reduces the size of the display element until it has the given size, thereby starting the display of the display element in the given size.

According to another aspect of the present invention, in the display device, it is preferable that after starting switching the display of the display element, the display section gradually reduces the size of the display element displayed before switching while gradually enlarging the size of the display element displayed after the switching, thereby simultaneously displaying the display element displayed after the switching and the display element displayed before the switching until the display element displayed before the switching is removed.

According to still another aspect of the present invention, in the display device, it is preferable that the display element is telltale display for representing various warnings.

According to still another aspect of the present invention, in the display device, it is preferable that the display element represents the current shift position.

According to still another aspect of the present invention, in the display device, it is preferable that after the display section displays the display element at a lower density than a given density at the start of display of the display element, the display section gradually increases the density of the display element until the display element has a higher density than the given density, and then gradually decreases the density of the display element until the display element has the given density, thereby starting the display of the display element at the given density.

With the above-described configuration of the display device, the display element representing the shift position, for example, is displayed in a larger size than a given size once at a start of display of the display element, thereby helping the driver to find a change of the shift position.

In addition, with the above-described configuration of the display device, the display element representing the shift position, for example, is displayed at a higher density than a given density once at a start of display of the display element, thereby helping the driver to find a change of the shift position.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a flowchart illustrating an example of a switching process of display of the shift indicator and illustrating an example of display using the display pattern 1.

DETAILED DESCRIPTION OF THE PREFERRED EMBODIMENTS

The following describes a display device according to the present embodiment with reference to the accompanying drawings. The display device according to the present embodiment is applied to a graphical meter installed in an instrument panel inside a vehicle compartment.

Figure 1:
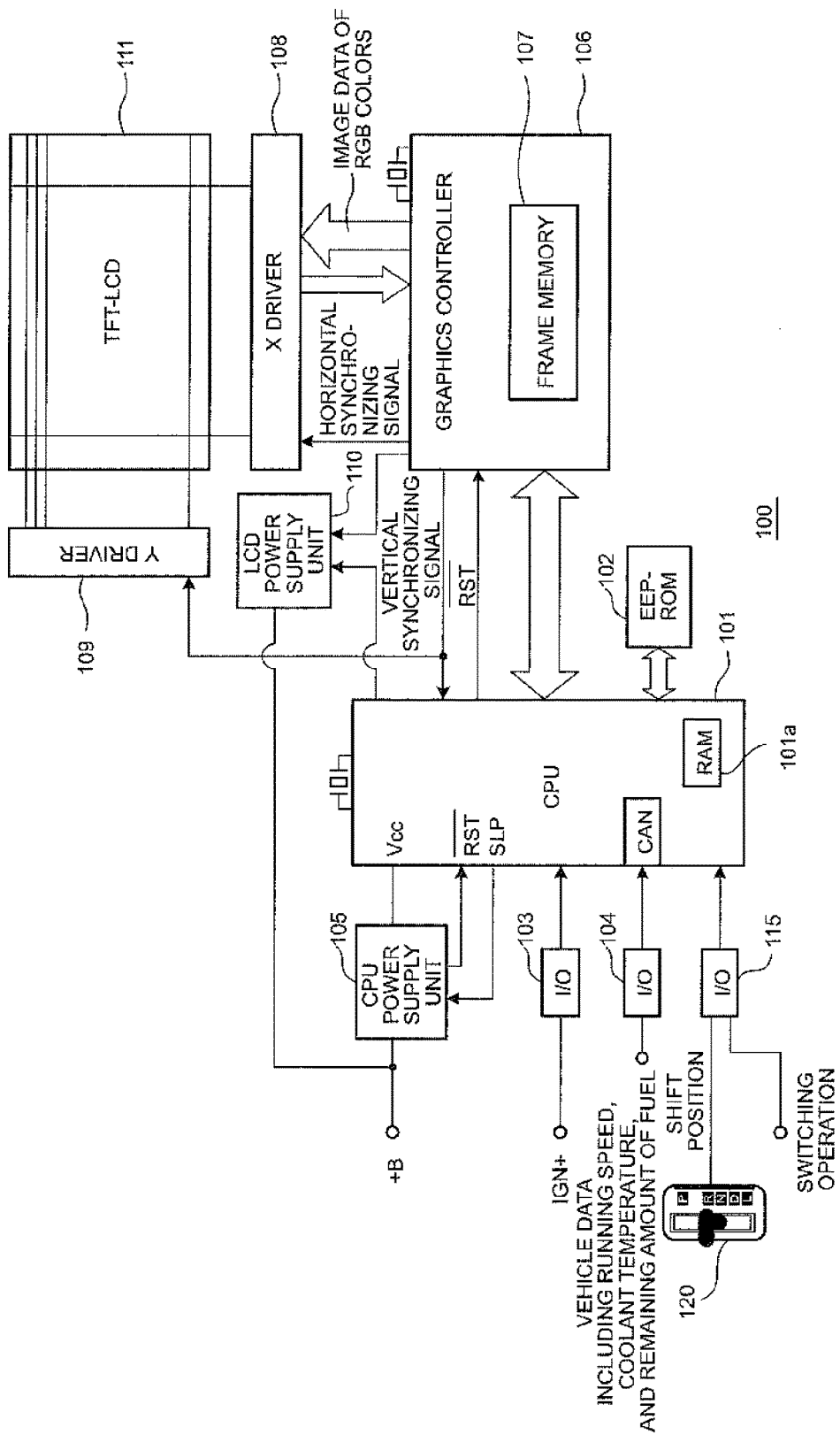
FIG. 1 is a block diagram illustrating an example of the hardware configuration of a display device according to a present embodiment.

FIG. 1 is a block diagram illustrating an example of the hardware configuration of a display device 100 that is a display device according to the present embodiment. As illustrated in FIG. 1, the display device 100 includes a controller (a microcomputer, a central processing unit (CPU)) 101, a read-only memory (an electrically erasable programmable read-only memory (EEPROM)) 102, an interface 103, an interface 104, an interface 115, a CPU power supply unit 105, a graphics controller 106, a frame memory 107, an X driver 108, a Y driver 109, a liquid crystal display (LCD) power supply unit 110, a display section (a liquid crystal display, a thin film transistor liquid crystal display (TFT-LCD)) 111, and other components.

Figure 5:
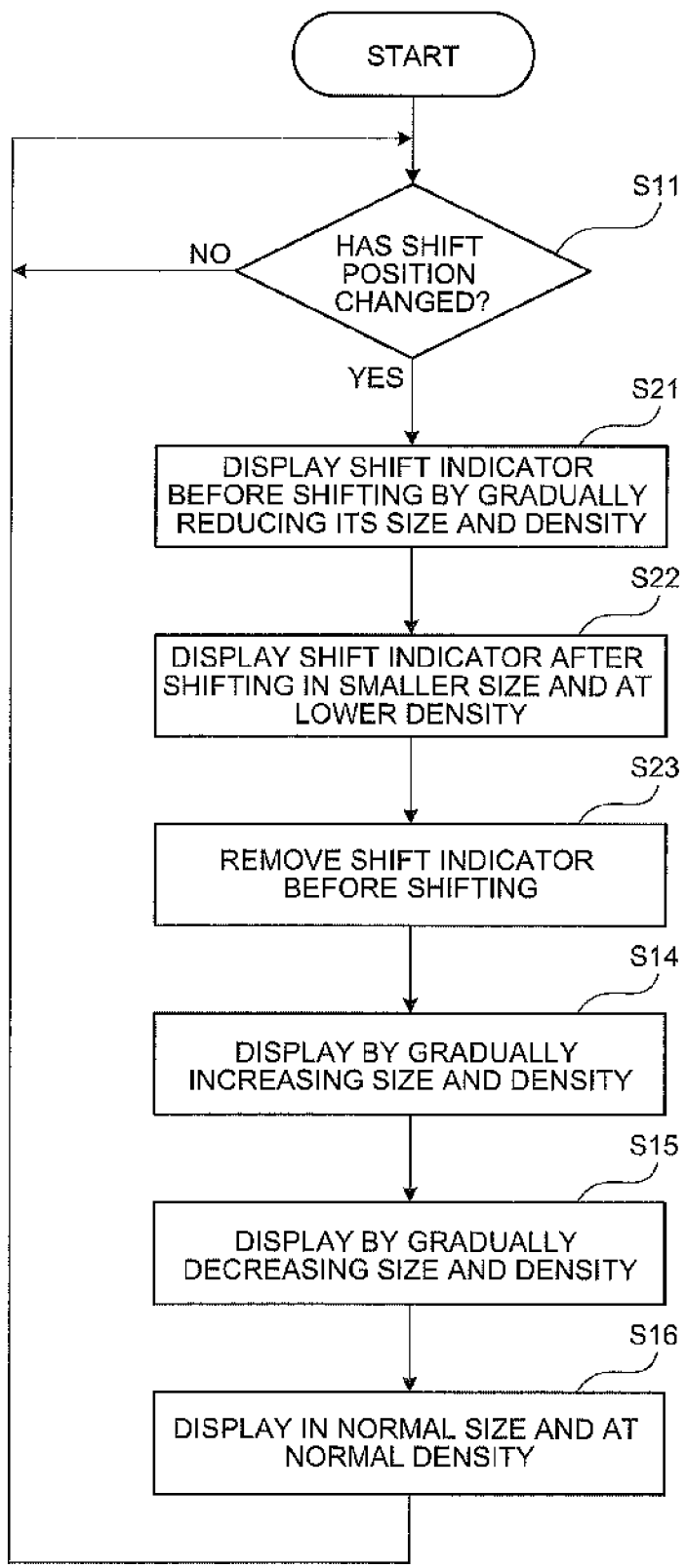
FIG. 5 is a flowchart illustrating another example of the switching process of the display of the shift indicator and illustrating an example of display using the display pattern 2.

The controller 101 executes a previously prepared computer program and various types of processing needed to implement the functions of the display device 100. For example, the controller 101 executes later-described drawing processing as illustrated in FIGS. 4 and 5. The controller 101 includes a random access memory (RAM) 101a for transitorily storing therein various types of data.

The read-only memory 102 retains various types of fixed data including contents of the computer program executed by the controller 101 and the display data for drawing a later-described shift indicator 25.

The interface 103 inputs a signal (IGN+) indicating the state of an ignition switch on the vehicle side to the controller 101.

The interface 104 is utilized for communications based on the controller area network (CAN) protocol between the controller 101 and various types of control devices (electric control units (ECUs)) on the vehicle side. Specifically, the data representing the current values of various types of quantity of states of a vehicle, such as a running speed, a coolant temperature, and the amount of fuel, is input from the vehicle side through the interface 104 to the controller 101 as substantially real-time data.

For example, the interface 104 receives a vehicle speed pulse signal output from a speed sensor mounted on the vehicle side every time the vehicle moves for a given amount of distance. The interface 104 then outputs the received signal to the controller 101 as running speed information representing the value of the current vehicle running speed.

The interface 104 receives information on a fuel amount detected by a fuel sensor, and then outputs the received information to the controller 101. The interface 104 also receives information on a coolant temperature detected by a temperature sensor, and then outputs the received information to the controller 101.

The interface 115 also receives a signal representing the shift position that is the operation position of a shift lever 120 from a shift sensor disposed near the driver's seat. The interface 115 then outputs the received information to the controller 101. The interface 115 also receives various types of switching operation, and then outputs them to the controller 101.

The CPU power supply unit 105 receives a direct-current power supplied from a positive power supply line (+B) on the vehicle side and generates a direct-current voltage (Vcc) necessary for the operation of the controller 101. The CPU power supply unit 105 generates a reset signal (RST) and performs an operation for reducing power supply according to a sleep signal (SLP) output from the controller 101, as necessary.

The display section 111 is a display section that includes a two-dimensional color display screen including a large number of micro display cells including liquid crystal devices and arranged in X and Y directions. The display section 111 is a display device with an image display system that controls the display states of the large number of micro display cells individually, thereby providing graphics display of desired information such as diagrams, characters, and images, on a two-dimensional display screen.

Figure 2:
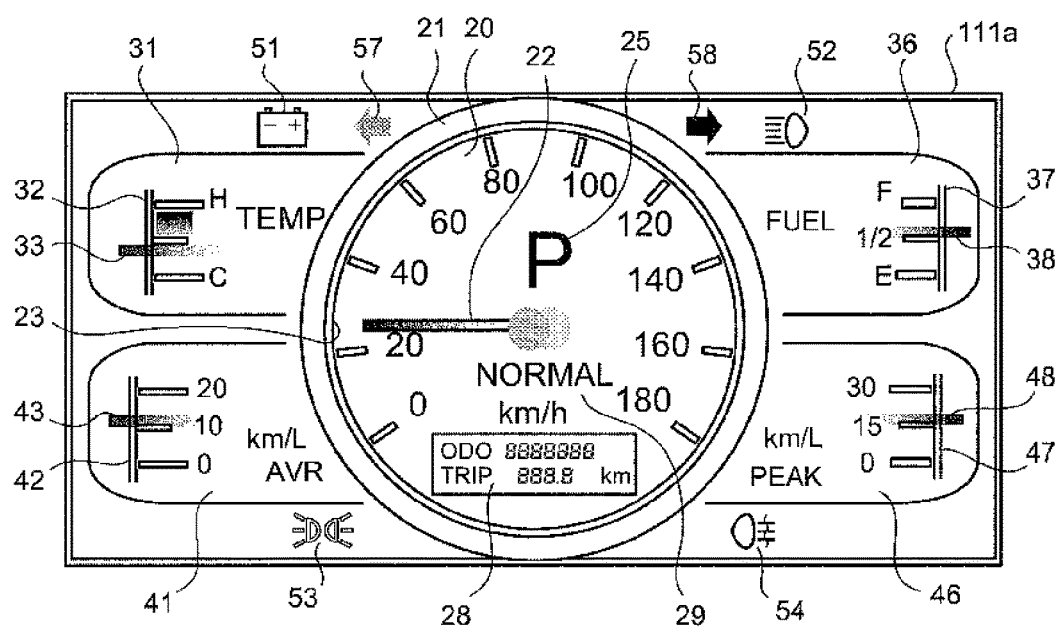
FIG. 2 is a diagram illustrating a graphics display screen of a display section.

FIG. 2 is a diagram illustrating a graphics display screen 111a of the display section 111. The lateral direction in FIG. 2 is denoted as the X direction and the vertical direction is denoted as the Y direction.

The central area of the graphics display screen 111a displays a speedometer 20 indicating the current vehicle running speed. The speedometer 20 includes a speed scale 23, a ring 21, and a pointer needle 22. The pointer needle 22 indicates a portion on the speed scale 23, thereby indicating the current vehicle running speed.

The lower display area in the ring 21 displays an odo/trip meter (distance meter) 28. The odo/trip meter 28 displays an ODO value (an accumulated travel distance) and a TRIP value (a travel distance). The lower central display area in the ring 21 displays a running mode 29, a character image of "NORMAL" in this example. The upper central display area in the ring 21 displays the shift indicator 25 representing the shift position with various marks (display elements): "P", "R", "N", "D", and "L". By the mark displayed out of the various marks as the shift indicator 25, the driver knows the current shift position. The display operation of the shift indicator 25 will be described in detail later.

The four areas surrounding the speedometer 20 displays the following meters and gauges as follows: the upper left area displays a coolant temperature gauge 31; the upper right area displays a fuel gauge 36; the lower left area displays an average fuel economy gauge 41; and the lower right area displays an instantaneous fuel economy gauge 46.

The coolant temperature gauge 31 includes a temperature scale 32 and a pointer needle 33. The temperature scale 32 is a bar-shaped scale extending in the Y direction, on the respective ends of which a hot (H) scale mark and a cold (C) scale mark are provided. The pointer needle 33 is displayed in a bar shape extending in the X direction on the temperature scale 32 and moves along the temperature scale 32 in the vertical direction (the Y direction), thereby indicating a coolant temperature according to the position of the pointer needle 33 in the Y direction.

The fuel gauge 36 includes a fuel scale 37 and a pointer needle 38. The fuel scale 37 is a bar-shaped scale extending in the Y direction, on the respective ends of which a full (F) scale mark and an empty (E) scale mark are provided, and a ½ scale mark is provided on the middle portion of the scale. The pointer needle 38 is displayed in a bar shape extending in the X direction on the fuel scale 37 and moves along the fuel scale 37 in the vertical direction (the Y direction), thereby indicating the remaining amount of fuel according to the position of the pointer needle 38 in the Y direction.

The average fuel economy gauge 41 includes a fuel economy scale 42 and a pointer needle 43. The fuel economy scale 42 is a bar-shaped scale extending in the Y direction, having a 20 km/L scale mark on its upper end, a 10 km/L scale mark on its middle portion, and a 0 km/L scale mark on its lower end. The pointer needle 43 is displayed in a bar shape extending in the X direction on the fuel economy scale 42 and moves along the fuel economy scale 42 in the vertical direction (the Y direction), thereby indicating the average fuel economy according to the position of the pointer needle 43 in the Y direction.

The instantaneous fuel economy gauge 46 includes a fuel economy scale 47 and a pointer needle 48. The fuel economy scale 47 is a bar-shaped scale extending in the Y direction, having a 30 km/L scale mark on its upper end, a 15 km/L scale mark on its middle portion, and a 0 km/L scale mark on its lower end. The pointer needle 48 is displayed in a bar shape extending in the X direction on the fuel economy scale 47 and moves along the fuel economy scale 47 in the vertical direction (the Y direction), thereby indicating the instantaneous fuel economy according to the position of the pointer needle 48 in the Y direction.

In the surrounding area of the speedometer 20, a turn R (turning right) display 58 and a turn L (turning left) display 57 each representing the position of the winker are disposed. In addition, four warning display elements 51, 52, 53, and 54 are disposed that represent different warnings, in the area.

Description will be continued with reference to FIG. 1 again. The scanning position on the graphics display screen 111*a* of the display section 111 in the Y direction is sequentially switched according to an output by the Y driver 109. The Y driver 109 sequentially switches the scanning position in the Y direction, in synchronization with a vertical synchronizing signal output from the graphics controller 106.

The X driver 108 sequentially switches the scanning position on the graphics display screen 111*a* of the display section 111 in the X direction, in synchronization with a horizontal synchronizing signal output from the graphics controller 106. The X driver 108 controls the display contents on the screen by providing image data of respective RGB colors output from the graphics controller 106 to the display cells at the scanning position.

The graphics controller 106 displays various graphic elements on the graphics display screen 111*a* of the display section 111 according to various instructions input from the controller 101. In practice, the controller 101 or the graphics controller 106 writes display data on the frame memory 107 that retains display contents for each pixel, thereby drawing graphics. The graphics controller 106 generates a vertical synchronizing signal and a horizontal synchronizing signal for two-dimensional scanning of the graphics display screen 111*a* of the display section 111. The graphics controller 106 then provides the display data stored in the frame memory 107 at an appropriate address to the display section 111 at a timing synchronized with these synchronizing signals.

The LCD power supply unit 110 receives direct-current power supplied from the positive power supply line (+B) on the vehicle side and generates given direct-current power necessary for display on the display section 111.

Figure 3A:
FIG. 3A is a diagram illustrating a display pattern of a shift indicator and is a diagram illustrating a display pattern 1.
Figure 3B:
FIG. 3B is a diagram illustrating a display pattern of the shift indicator and is a diagram illustrating a display pattern 2.

FIGS. 3A and 3B are diagrams illustrating display patterns of the shift indicator 25. FIG. 3A illustrates a display pattern 1 and FIG. 3B illustrates a display pattern 2, respectively. The following describes an example of shifting the shift position from the "N" mark representing the neutral to the "P" mark representing the parking. The description is provided merely for exemplary purpose and not limiting. The shift positions before and after the shifting are optionally selectable.

In the display pattern 1, the shift operation by the driver in the normal state, in which the "N" mark representing the neutral that is the shift position before the shifting is displayed in a normal size and at a normal density, changes display of the shift indicator 25 as described below.

In other words, starting the display switching of the shift indicator 25 removes the "N" mark displayed as the shift indicator 25. Subsequently, the "P" mark representing the parking that is the shift position after the shifting is displayed in a smaller size than that in the normal state, and at a lower density than the normal density.

The "P" mark then gradually becomes larger and darker to have the size and the density in the normal state, and then becomes still larger and darker. After the "P" mark reaches a given size and density, the "P" mark gradually becomes smaller and lighter to have the size and the density in the normal state, and remains in that state. In the display pattern 1, the shift indicator 25 changes from "N" to "P" through the change of the display contents described above.

By contrast, in the display pattern 2, after the shift operation by the driver starts switching the display of the shift indicator 25, the "N" mark representing the neutral that is the shift position before the shifting gradually becomes smaller and lighter while the "P" mark representing the parking that is the shift position after the shifting gradually becomes larger and darker.

After the "N" mark is removed, the "P" mark gradually becomes larger and darker in the same manner as in the display pattern 1. The "P" mark reaches the normal size and the normal density, and then becomes still larger and darker. After the "P" mark reaches a given size and density, the "P" mark gradually becomes smaller and lighter to have the normal size and the normal density, and remains in that state.

The following describes the above-described switching of the display of the shift indicator 25 in detail. FIG. 4 is a flowchart illustrating an example of the switching process of the display of the shift indicator 25 and illustrating an example of display using the display pattern 1. The computer program for executing this process is stored in the read-only memory 102. The controller 101 executes the computer program, thereby switching the display contents of the shift indicator 25 displayed on the display section 111. For simplification of description, the controller 101 is the subject that changes the display contents in the description below. In practice, the controller 101 outputs a control signal to control the display section 111 to change its display contents.

Firstly, the controller 101 determines whether switch of the shift indicator 25 has been instructed, that is, whether the driver has operated the shift lever 120 to change the shift position (Step S11).

If the shift position has not changed, the controller 101 repeats the processing at Step S11. If the shift position has changed, the controller 101 removes the "N" mark representing the neutral before the shifting (Step S12). The controller 101 then displays the "P" mark representing the parking after the shifting in a smaller size than that in the normal state, and at a lower density than that in the normal state (Step S13).

Subsequently, the controller 101 gradually increases the size and the density of the "P" mark until they reach the normal size and the normal density, and then further increases the size and the density of the mark (Step S14).

The controller 101 then gradually decreases the size and the density of the "P" mark until they reach the normal size and the normal density, and maintains the mark in that state (Step S15, Step S16). After that, the controller 101 returns to the processing at Step S11.

Executing the above-described processing changes the mode of display of the shift indicator 25 displayed on the display section 111 from "N" to "P" as in the above-described display pattern 1 illustrated in FIG. 3A. That is, after the newly displayed "P" mark once becomes larger than the size in the normal state and at a higher density than the density in the normal state, display of the "P" mark in the size and at the density in the normal state is started. With the display device 100 according to the embodiment, the shift indicator 25 that is a display element displayed in a smaller size than the speedometer 20, for example, and is not easily paid attention to during driving, is displayed larger than the size in the normal state and at a higher density than the density in the normal state once at the time of switching the display of the shift indicator 25. This operation helps the driver to find a change of the display.

The following describes another processing for displaying the shift indicator 25 with reference to FIG. 5. FIG. 5 is a flowchart illustrating a different example of the switching process of the display of the shift indicator 25 and illustrating an example of display using the display pattern 2. The processing at Steps S21 to S23 that uses the display pattern 2 differs from the processing that uses the display pattern 1. Other processing is identical to the above-described processing, which is designated by the reference numerals identical to those in the above-described processing.

At Step S21, the controller 101 starts the processing that gradually reduces the size and the density of the "N" mark representing the neutral before the shifting and displayed in the normal state.

The controller 101 displays the "P" mark representing the parking after the shifting in a smaller size and at a lower density while the controller 101 gradually decreases the size and the density of the "N" mark (Step S22).

The controller 101 removes the "N" mark representing the neutral before the shifting (Step S23).

Subsequently, the controller 101 gradually increases the size and the density of the "P" mark until they reach the normal size and the normal density, and then further increases the size and the density of the mark (Step S14). The controller 101 gradually decreases the size and the density of the "P" mark until they reach the normal size and the normal density, and maintains the mark in that state (Step S15, Step S16). After that, the controller 101 returns to the processing at Step S11.

Executing the above-described processing changes the mode of display of the shift indicator 25 displayed on the display section 111 from "N" to "P" as in the above-described display pattern 2 illustrated in FIG. 3B. Specifically, while the "N" mark is displayed in a smaller size and at a lower density and finally removed, the "P" mark is simultaneously displayed in a smaller size and at a lower density, thereby starting the display of the "P" mark.

The following summarizes the display device 100 according to the present embodiment.

(1) The display device 100 includes the display section 111 that displays the shift indicator 25 that is a display element representing the current shift position in a given size (a size in the normal state). The display section 111 displays the shift indicator 25 in a smaller size than that in the normal state at a start of the display (upon switching the display) of the shift indicator 25. After that, the display section 111 gradually enlarges the shift indicator 25 until it has a larger size than that in the normal state, and then gradually reduces the shift indicator 25 until it has the size in the normal state, thereby starting the display of the shift indicator 25 in the size in the normal state.

(2) In the display device 100, the display section 111 displays the shift indicator 25 at a lower density than that in the normal state at a start of the display of the shift indicator 25. After that, the display section 111 gradually increases the density until it has a higher density than that in the normal state, and then gradually decreases the density until it has the density in the normal state, thereby starting the display of the shift indicator 25 at the density in the normal state.

The scope of the technology in the present invention is not limited to the above-described embodiment. The embodiment can be modified and improved within the scope of the technology in the invention.

In the above-described embodiment, the display contents change at a switch of the display of the shift position. Alternatively, the display contents may change at a start of the display of the shift position. That is, a shift operation in a state that the shift indicator 25 is not displayed on the display section 111 may newly start the display of the shift indicator 25.

In the above-described embodiment, the display contents change at a switch of the display of the shift indicator 25. Alternatively, the present invention may be applied to switching on and off of the warning display elements 51, 52, 53, and 54. That is, the display method in the present invention can be applied to various types of telltale display.

In the above-described embodiment, one of the display pattern 1 illustrated in FIG. 3A and the display pattern 2 illustrated in FIG. 3B is used. Alternatively, those display patterns may be switched through switching operation by the driver received from the interface 115.

The present invention can provide a display device through which a driver can readily recognize the current shift position.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
a display section that is mounted on a vehicle, configured to display a display element presenting information to a driver in a given size, and capable of switching the display element, wherein
the display section displays the display element in a smaller size than the given size at a start of display of the display element, gradually enlarges a size of the display element until it has a larger size than the given size, and then gradually reduces the size of the display element until it has the given size, thereby starting the display of the display element in the given size, and
after starting switching the display of the display element, the display section gradually reduces the size of the display element displayed before switching while gradually enlarging the size of the display element displayed after the switching, thereby simultaneously displaying the display element displayed after the switching and the display element displayed before the switching until the display element displayed before the switching is removed.

2. The display device according to claim 1, wherein the display element is telltale display for representing various warnings.

3. The display device according to claim 1, wherein the display element represents the current shift position.

4. The display device according to claim 2, wherein the display element represents the current shift position.

5. The display device according to claim 1, wherein after the display section displays the display element at a lower density than a given density at the start of display of the display element, the display section gradually increases the density of the display element until the display element has a higher density than the given density, and then gradually decreases the density of the display element until the display element has the given density, thereby starting the display of the display element at the given density.

6. The display device according to claim 2, wherein
after the display section displays the display element at a lower density than a given density at the start of display of the display element, the display section gradually increases the density of the display element until the display element has a higher density than the given density, and then gradually decreases the density of the display element until the display element has the given density, thereby starting the display of the display element at the given density.

7. The display device according to claim 3, wherein
after the display section displays the display element at a lower density than a given density at the start of display of the display element, the display section gradually increases the density of the display element until the display element has a higher density than the given density, and then gradually decreases the density of the display element until the display element has the given density, thereby starting the display of the display element at the given density.

* * * * *